United States Patent [19]

Breyer et al.

[11] Patent Number: 4,707,278

[45] Date of Patent: Nov. 17, 1987

[54] CONTROL VALVE

[75] Inventors: Karl Breyer, Ingelfingen; Roland Tesar, Winterbach, both of Fed. Rep. of Germany

[73] Assignee: Herion-Werke KG, Fellbach, Fed. Rep. of Germany

[21] Appl. No.: 803,392

[22] Filed: Dec. 2, 1985

[30] Foreign Application Priority Data

Dec. 3, 1984 [DE] Fed. Rep. of Germany ....... 3444039

[51] Int. Cl.$^4$ .......................... F16K 1/38; F16K 1/42; F16K 47/02
[52] U.S. Cl. .................................. 251/122; 251/118; 251/903
[58] Field of Search ............... 251/122, 123, 127, 903

[56] References Cited

U.S. PATENT DOCUMENTS

| | | | |
|---|---|---|---|
| 1,163,370 | 12/1915 | Ryan | 251/127 |
| 1,843,462 | 2/1932 | Scott | 251/127 |
| 2,014,314 | 9/1935 | Defenbaugh | 251/122 |
| 2,061,852 | 11/1936 | Schweitzer | 251/122 |
| 3,588,037 | 6/1971 | Ritchie | 251/127 |
| 3,880,399 | 4/1975 | Luthe | 251/127 |
| 4,047,695 | 9/1977 | Cleveland et al. | 251/122 |
| 4,337,788 | 7/1982 | Seger | 251/122 |
| 4,397,331 | 8/1983 | Medlar | 251/127 |

Primary Examiner—Arnold Rosenthal
Attorney, Agent, or Firm—Henry M. Feiereisen

[57] ABSTRACT

A control valve includes a valve box whose interior accommodates a valve needle closing against a valve seat. The interior of the valve box is subdivided in sections with at least two conical bores with different cone angles for improving the flow guidance and providing more uniform velocity distribution.

18 Claims, 6 Drawing Figures

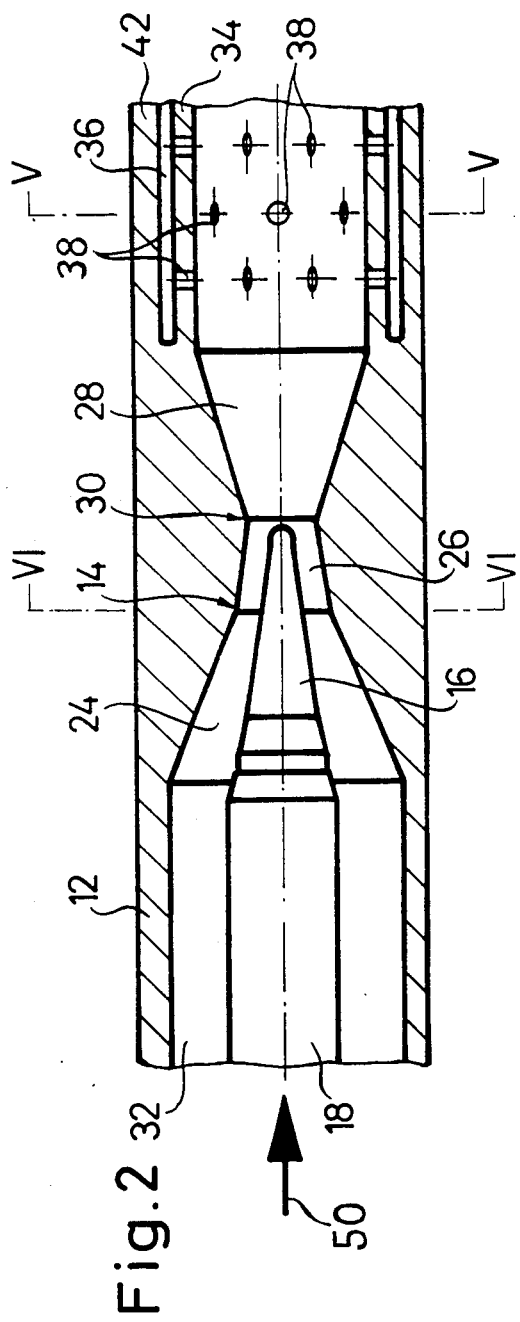
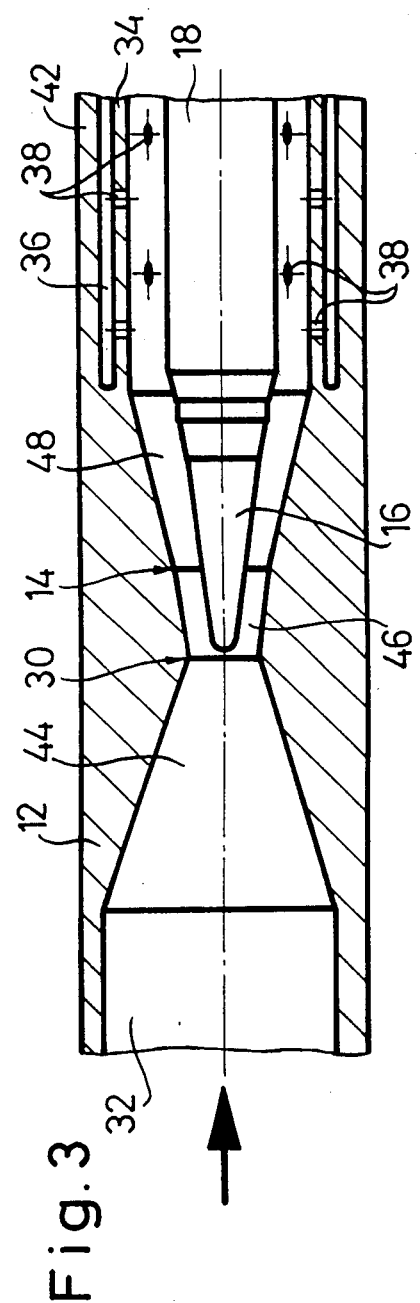
Fig. 2
Fig. 3

CONTROL VALVE

FIELD OF THE INVENTION

The present invention refers to a control valve, especially for high-pressure, dust laden gases for controlling the flow through the valve.

BACKGROUND OF THE INVENTION

In process plants like e.g. coal gasification plants, highly dust containing and dust laden gases are generated with pressures of e.g. 100–350 bar and temperatures in the range of e.g. 750°. These gases are expanded via valves and released into collecting containers for further use e.g. as process gas for boiler firing or as synthesis gas for chemical processes.

Valves are known provided with a parabolic valve body which cooperates with a valve seat in the shape of a screen and whose lift is adjustable to regulate the flow rate of the gas through the valve. It has been shown in practice, however, that due to erosion, the dust particles contained in the gas and accelerated to considerable velocities cause considerable damages of the closing elements and control elements of such a valve and partly also of the pipe wall. A further drawback of such valves resides in that the dust particles deposit and sinter on the valve body.

OBJECT OF THE INVENTION

It is thus the principal of the present invention to provide an improved control valve obviating the aforestated drawbacks.

SUMMARY OF THE INVENTION

This object is realized in accordance with the present invention by providing a valve box whose interior accommodates a valve needle closing against a valve seat and is subdivided in sections with a first bore tapering towards said valve seat and a second bore tapering from said valve seat towards an area of minimum cross section.

According to a further feature of the invention, the second bore has a taper angle smaller than the taper angle of the first bore. Advantageously, a third bore is provided which expands in axial direction from the second bore. By sectioning the interior according to the invention, the fluid, especially high-pressure dust laden gas is accelerated to sonic speed through the combination of the first and second bores and then further accelerated to supersonic speed within the third bore. Through the provision of a control valve according to the invention, the guidance of the flow is improved and a more uniform velocity distribution is provided over the flow area thereby preventing turbulences, separations and dead water zones as well as erosions and deposits of dust on the control elements.

When having gas and vapo flows at velocities in the sonic sound or supersonic sound range, shocks and waves are obtained within the pipes which are connected to the control valve. This results in gas vibrations and periodical pressure changes and causes directional changes of the gas flow creating a considerable sound emission and causing damages of the pipe wall by separations induced through the shocks.

Therefore, according to a further teaching of the invention, it is proposed to provide a cylindrical absorbing tube to provide the control valve with a low emission of sound. Preferably, the tube is separated from the surrounding pipe by an annular space which communicated with the interior of the tube via a plurality of boreholes.

BRIEF DESCRIPTION OF THE DRAWING

The above objects, features and advantages of the present invention will now be described in more detail with reference to the accompanying drawing in which:

FIG. 2 is a sectional view on an enlarged scale of a portion of the control valve of FIG. 1;

FIG. 3 is a sectional view similar to FIG. 2 of a further embodiment of a control valve according to the invention;

DESCRIPTION

Figure 6:
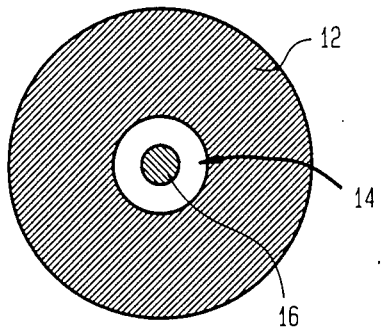
FIG. 6 is a cross sectional view of the control valve of FIG. 2 taken along the line VI—VI in FIG. 2

In the drawing, I have shown a control valve in particular a needle valve generally designated by reference numeral 10 for regulating the flow of a fluid like high-pressure, dust laden gas. The control valve 10 includes a tubular valve box 12 which is connected at its inlet to a pipe socket 40 and at its outlet to a further pipe socket 42 of an otherwise not shown conduit. The pipe socket 40 is bend and supports a guide bush 20 provided with a central through-hole 20a. Traversing the through-hole 20a and extending beyond the guide bush 20 is the rearward section 19 of a valve stem 18 which is supported in an axially movable manner in the bush 20. At its forward end, the valve stem 18 is provided with a slender pointed valve needle 16 of conical shape. For controlling the flow of fluid, the valve needle 16 cooperates with a valve seat 14 which is suitably a circular disk with a central opening (FIG. 6). The control valve 10 is in the closing position when the valve needle 16 tightly rests in the opening of the valve seat 14.

Extending in axial direction about its circumference, the valve stem 18 is provided with a plurality of baffle plates 22 which guide and direct the fluid (gas flow or vapor flow) entering through the pipe socket 40. Although not shown in the drawing, in case the valve stem 18 is surrounded by a jacket, further baffle plates 22 may also be provided about the circumference of the jacket. Additional baffle plates 22 may also be provided projecting from the inner wall of the valve box 12 toward the valve stem 18.

Figure 1:
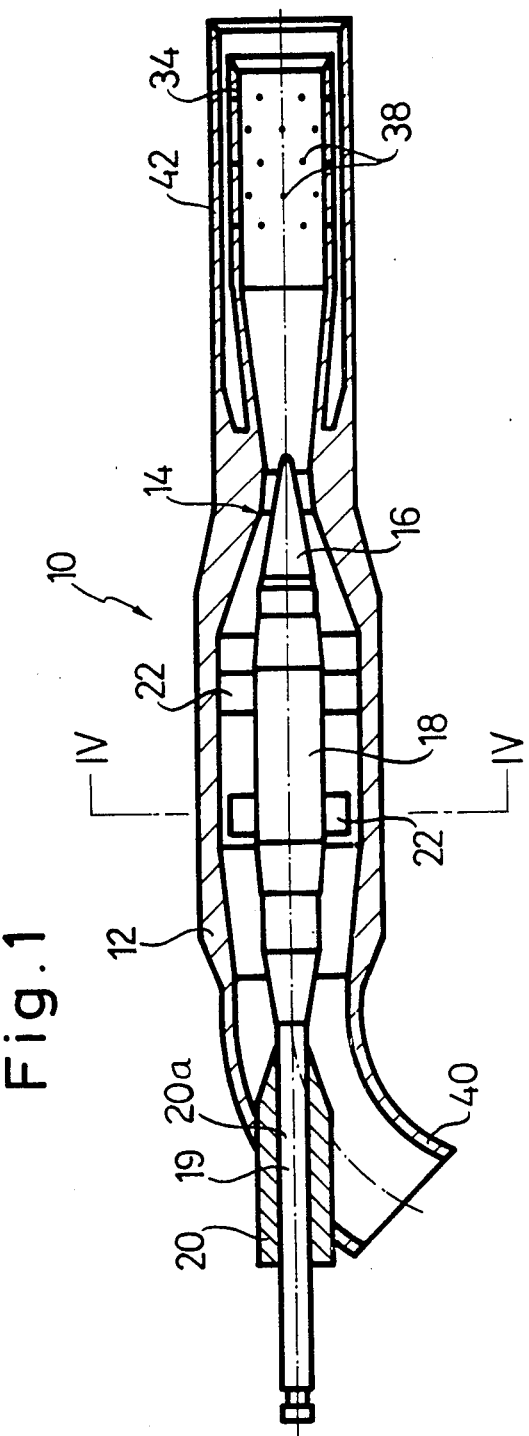
FIG. 1 is a schematic, sectional view of one embodiment of a control valve according to the invention.
Figure 4:
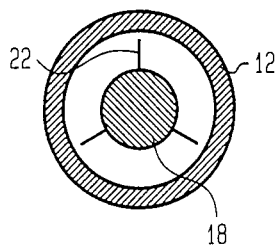
FIG. 4 is a cross sectional view of the control valve of FIG. 2 taken along the line IV—IV in FIG. 1.
Figure 5:
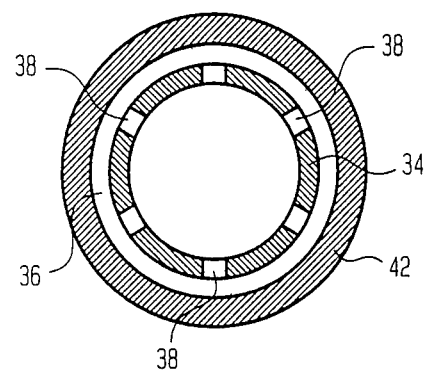
FIG. 5 is a cross sectional view of the control valve of FIG. 2 taken along the line V—V in FIG. 2.

As is shown especially in FIG. 4, three baffle plates 22 are uniformly spaced about the circumference of the valve stem 18 at an angular distance of 120°. Any other number of baffle plates may, however, also be suitable extending about the circumference of the valve stem 18, e.g. four baffle plates at an angular distance of 90°. It is also possible to arrange several such groups of baffle plates 22 at an axial distance to each other.

Surrounded by the pipe socket 42 is a cylindrical absorbing tube 34 which is in communication with an annular chamber 36 extending in-between the wall of the pipe socket 42 subjected to pressure and the absorbing tube 34. The connection of the tube 34 to the annular chamber 36 is provided by a plurality of radial boreholes, 38 which are arranged about the circumference of the absorbing tube 34 and are offset to each other in axial direction. The entire area covered by all boreholes 38 amounts to about 10% of the inner wall area of the absorbing tube 34.

Turning now especially to FIG. 2 which illustrates in more detail the flow area through the interior of the valve box 12. Accordingly, the valve box 12 has a cylindrical section i.e. cylindrical bore 32 which essentially accommodates the valve stem 18 with its baffle plates 22. Connected to the cylindrical bore 32 at its end remote to the pipe socket 40 is a first section or bore 24 tapering at a certain angle in flow direction as indicated by arrow 50. The tapered section 24 extends from the cylindrical section 32 to the valve seat 14.

Extending from the valve seat 14 in flow direction is a second tapered section or bore 26 whose angle of taper is smaller than the angle of taper defined by the bore 24 and which at its end remote to the first bore 24 has a cross section 30 defining the narrowest point within the valve box 12. Connecting the second bore 26 in the downstream area with the absorbing tube 34 is a tube section or bore 28 which widens in flow direction 50 toward the tube 34 and constitutes an expansion nozzle. FIG. 2 shows the third bore 28 of conical-shape, however, it is also possible to provide the third bore in a bell-shaped manner.

The valve needle 16 is moved by the fluid i.e. dust laden gases flowing through the valve 10 in flow direction as indicated by arrow 50 to tightly close the valve seat 14. After flowing through the pipe socket 40 and passing through the cylindrical bore 32, the fluid enters the tapered bore 24 which accelerates the flow in the area before the actual valve seat 14. Within the subsequent second tapered bore 26 whose taper angle is smaller than the taper angle of the first section 24, the fluid is further accelerated so that upon prevailing critical pressure ratios in the bore 26 in dependence on the position of the valve needle 16, the fluid reaches sonic speed. In the bore 28 following the narrowest cross section 30 of bore 26, the fluid is accelerated to supersonic speed.

Through the provision especially of the bore 26, the flow of the fluid is stabilized so that a uniform velocity distribution of the fluid flow over its area is obtained and turbulences and separations are avoided, thus preventing an erosion of the control valve or a sintering of dust particles on the control valve.

A further improvement of the fluid flow resulting in a further reduction of erosion or sintering of dust particles is achieved when providing the cross section of the valve seat 14 i.e. the junction between the bore 24 and the bore 26 in the shape of an annular edge.

In the following, a dimensional relationship between the individual bores of the control valve 10 is given:

When defining the cylindrical bore 32 of the valve box 12 with a diameter DN, the valve seat 14 has preferably a diameter D of 0,25–0,35 DN, especially 0,3 DN. The diameter of the cross section 30 is preferably 0,7–0,9 D.

The bore 26 has an axial length preferably between 0,75–1,5 D. The cone angle of the valve needle 16 is e.g. 5°–12°. The angle of taper of the bore 24 is e.g. 15°–30° while the one of the bore 26 is e.g. 4°–12° and the one of the bore 28 is e.g. 10°–24°.

The lift of the valve head 16 corresponds approximately to the diameter D of the valve seat 14.

Turning now to FIG. 3 which shows the use of the control valve 10 with its valve needle 16 facing in opposite direction and with a reversed closing movement counter to the flow direction as indicated by arrow 50 of the dust laden gases.

Accordingly, the valve box 12 is provided with a first bore 44 tapering in flow direction from the cylindrical bore 32 toward a second bore 46 which essentially corresponds to the bore 26 in FIG. 2. The junction between the bore 44 and the bore 46 constitutes the narrowest cross section 30. In the position of the control valve 10 shown in FIG. 3, the second bore 46 expands conically from the narrowest cross section 30 to the valve seat 14. Leading from the valve seat 14 is a conical bore 48 whose other end is connected to the absorbing tube 34. within which the valve stem 18 extends in axial direction.

The bore 48 which constitutes an expansion nozzle has a cone angle exceeding the cone angle of the bore 46. The junction as defined by the valve seat 14 between the bore 46 and the boren 48 is also provided in form of an annular edge.

In the position of the control valve 10 as in FIG. 3, the fluid flow is accelerated in the tapered bore 44. Depending on the position of the valve needle 16 within the bore 46 that is in the area between the narrowest cross section 30 and the in the area between the narrowest cross section 30 and the valve seat 14, the fluid reaches sonic speed and is further accelerated to supersonic speed within the expanding bore 48.

Also in case of positioning the control valve 10 in opposite direction counter to the flow direction as indicated by arrow 50, the fluid flows in an optimum manner as especially a uniform velocity distribution over the flow area in the valve box 12 is achieved and the formation of turbulences, separations and dead water zones are prevented. Thus, an erosion of the valve elements and sintering of dust particles is avoided.

I claim:
1. A control valve; comprising:
   a valve box defining an axis and having an interior;
   a valve seat accommodated in said interior; and
   a valve needle extending within said interior and closing against said valve seat, said interior of said valve box being subdivided in sections in direction of said axis and including a first bore tapering towards said valve seat and a second bore tapering from said valve seat towards an area of minimum cross section, each of said first and second bores being defined by an angle of taper, the taper angle of said second bore being smaller than the taper angle of said first bore.
2. A control valve as defined in claim 1 wherein said valve seat defines between said first bore and said second bore a junction which is shaped as an annular edge.
3. A control valve as defined in claim 1 wherein said interior includes a third bore extending in direction of said axis and expanding from said area of minimum cross section.
4. A control valve as defined in claim 3 wherein said third bore is conically shaped.
5. A control valve as defined in claim 3 wherein said third bore is bell-shaped.
6. A control valve as defined in claim 3, and further comprising an absorbing tube connected to said third bore at its end remote to said area of minimum cross section and surrounded by a pipe connected to said valve box, said absorbing tube being separated from said pipe by an annular space.

7. A control valve as defined in claim 6 wherein said absorbing tube has an interior and is provided with a plurality of boreholes connecting said interior of said absorbing tube with said annular space.

8. A control valve as defined in claim 7 wherein said absorbing tube has an inner wall of predetermined surface dimension, said boreholes covering an area of approximately 10% of the entire surface of said inner wall.

9. A control valve as defined in claim 1 wherein said first bore has a taper angle between a range of approximately 15°–30°.

10. A control valve as defined in claim 1 wherein said second bore has a taper angle between a range of approximately 4°–12°.

11. A control valve as defined in claim 4 wherein said third bore has a cone angle between a range of approximately 10°–24°.

12. A control valve as defined in claim 1 wherein said valve needle is tapered at an angle of approximately 5°–12°.

13. A control valve as defined in claim 1 wherein said valve seat has a diameter, said second bore has an axial length of about 0,75–1,5 times the diameter of said valve seat.

14. A control valve as defined in claim 1 wherein said area of minimum cross section has a diameter and said valve seat has a diameter, said diameter of said cross section being approximately 0,7–0,9 times said diameter of said valve seat.

15. A control valve as defined in claim 1, and further comprising a valve stem connected to said valve needle in axial direction and a plurality of baffle plates extending in axial direction about the circumference of said valve stem for guiding and directing a fluid flow.

16. A control valve as defined in claim 1 wherein said valve box has an inner wall, and further comprising a plurality of baffle plates extending in axial direction from said inner wall of said valve box toward its interior.

17. A control valve, especially for high-pressure dust laden gas; comprising:
a tubular valve box connected between an inlet pipe and an outlet pipe through which the gas flows, said valve box defining an axis and having an interior;
a valve seat accommodated in said interior; and
a valve needle extending within said interior and closing against said valve seat in flow direction of the gas, said interior of said valve box being subdivided in sections and including in flow direction of the gas a cylindrical bore, a first bore tapering towards said valve seat from said cylindrical bore, a second bore tapering from said valve seat towards an area of minimum cross section and a third bore extending in direction of said axis and expanding from said area of minimum cross section, said second bore having a taper angle smaller than the taper angle of said first bore.

18. A control valve, especially for high-pressure dust laden gas; comprising:
a tubular valve box connected between an inlet pipe and an outlet pipe through which the gas flows, said valve box defining an axis and having an interior;
a valve seat accommodated in said interior; and
a valve needle extending within said interior and closing against said valve seat counter to the flow direction of the gas, said interior of said valve box being subdivided in sections and including in flow direction of the gas a cylindrical bore, a first bore tapering towards an area of minimum cross section from said cylindrical bore, a second bore expanding conically towards said valve seat from said area of minimum cross section and a third bore expanding from said valve seat in flow direction of the gas, said third bore having a cone angle exceeding the cone angle of said second bore.

* * * * *